(Model.)
W. L. GEBBY.
Treating Sorghum or Ribbon Cane.
No. 241,207.  Patented May 10, 1881.
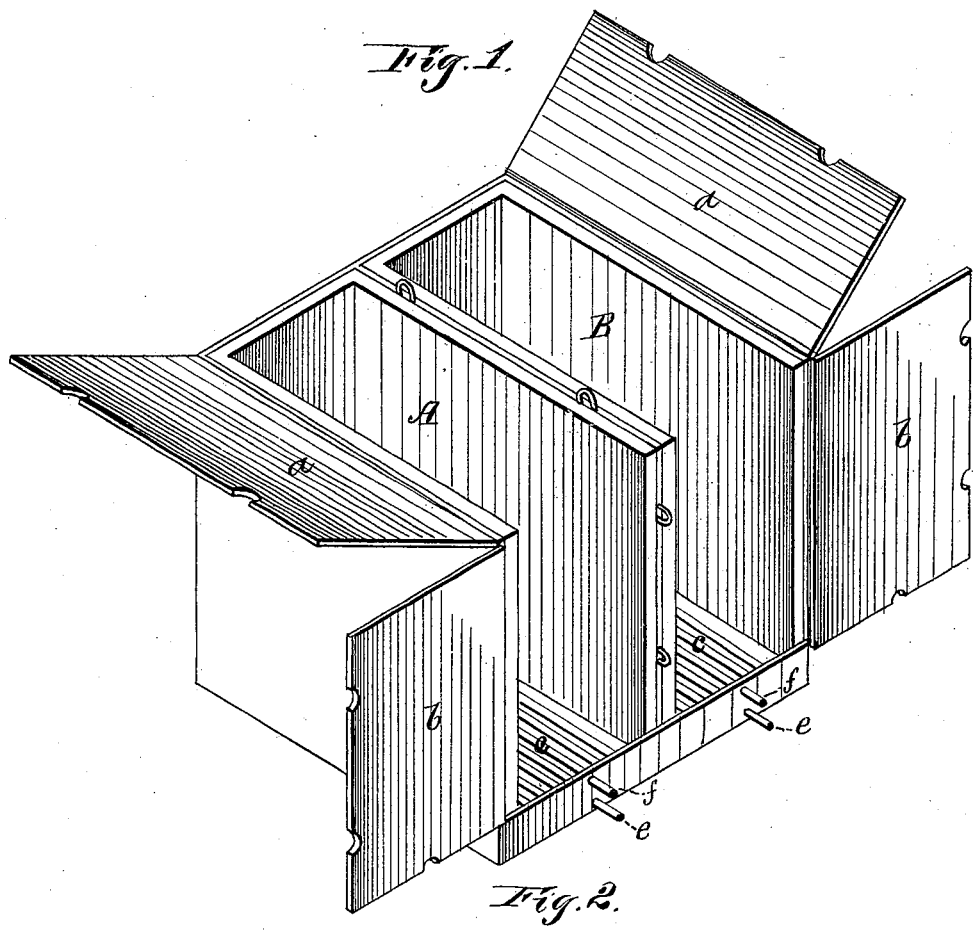
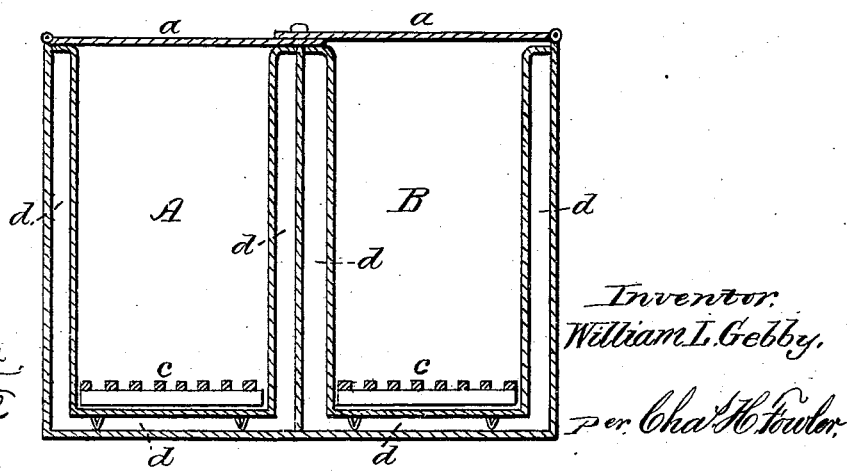
N. PETERS, Photo-Lithographer, Washington, D. C.

United States Patent Office.

WILLIAM L. GEBBY, OF NEW RICHLAND, ASSIGNOR OF TWO-THIRDS TO HUGH HUSTON AND ISAIAH LARKINS, OF DUNKIRK, OHIO.

TREATING SORGHUM OR RIBBON CANE.

SPECIFICATION forming part of Letters Patent No. 241,207, dated May 10, 1881.

Application filed March 26, 1881. (Model.)

*To all whom it may concern:*

Be it known that I, WILLIAM L. GEBBY, a citizen of the United States, residing at New Richland, in the county of Logan and State of Ohio, have invented certain new and useful Improvements in Treating Sorghum or Ribbon Cane; and I do hereby declare that the following is a full, clear, and exact description of the same, reference being had to the annexed drawings, making a part of this specification, and to the letters and figures of reference marked thereon.

Figure 1 of the drawings is a perspective view of the steaming and drying chest with the several doors thrown open; and Fig. 2 is a longitudinal vertical section thereof.

The present invention has relation to certain new and valuable improvements in the treatment of sorghum or ribbon cane previous to its being pressed or acted upon by mechanical means in the manufacture of molasses or sugar.

The invention consists in first steaming the stalks by bringing the steam in direct contact with the outer part of the stalk and afterward drying them by bringing the steam around and against the outside of the steaming-chest, whereby a matter is destroyed in the outer part of the stalk which, if left therein, would be detrimental to the flavor of both sugar and sirups.

In the accompanying drawings, A B represent two steaming and drying chests, constructed of any suitable material.

The chests A B are provided at their top with suitable doors $a$, and at their sides doors $b$. These doors are so constructed as to be perfectly air-tight when closed, and may be fastened by any convenient means.

The chests A B are each provided with a removable grating, $c$, resting upon the bottom of the chests, but so constructed as to allow the free passage of the steam around and through the same, the object of said grates being to keep the weight of the stalks off the bottom of the chests, to insure, as above set forth, the unobstructed circulation of the steam.

Each one of the steam-chests is enveloped or surrounded upon its four sides and bottom with a steam-space, $d$, into which steam is admitted through a pipe, $e$, and to the steam-chest through a pipe, $f$. These pipes $e$ $f$, which connect, respectively, the steam space and chest, are provided with suitable faucets to shut off the steam when required, the pipes being connected, by any convenient means, to a steam-generating apparatus of any of the ordinary forms.

In treating the cane-stalks they are first placed in an upright position in the steam-chests, with their butts resting on the gratings $c$, after which the several doors are securely closed, and, if desired, fastened, thus rendering the steam-chests perfectly air-tight. The steam is next turned on from the pipes $f$ to bring the steam in direct contact with the stalks in the chests, which thoroughly cooks them. After the cane-stalks have been sufficiently treated by the action of the steam the several doors are opened, and the steam turned off and at the same time steam turned on from the pipes $e$, which passes into and around the spaces $d$. The action of the steam against the walls and bottom of the chests A B thoroughly dries the surface of the stalks, after which they are removed and pressed in an ordinary cane-mill, the juice being boiled in the usual evaporator until it is reduced to molasses or sugar, as desired. This steaming and drying process frees the cane from all acids and other impurities, which hinder and prevent granulation, and obtains a greater percentage of saccharine matter from the cane than is done by the old process.

It should be further understood that the drying process which I subject the cane to extracts that matter which has heretofore retarded the process of granulating.

By the treatment of the cane-stalks as heretofore described sugar can be obtained without dripping.

I do not desire to be understood as confining myself to any special form or size of steam-chests, steam-spaces, or gratings, or to the number of said chests, or the material from which the several parts are constructed; but I would prefer, however, to have the several parts formed of heavy sheet-iron and the gratings of wood, as best adapted to the purpose.

Having now fully described my invention, what I claim as new, and desire to secure by Letters Patent, is—

The method of treating sorghum or ribbon cane by first placing the stalks within an airtight chest and bringing the steam in direct contact therewith and afterward drying the stalks by bringing the steam within an air-tight space around the chest, substantially as and for the purpose set forth.

In testimony that I claim the above I have hereunto subscribed my name in the presence of two witnesses.

WILLIAM L. GEBBY.

Witnesses:
S. M. HOVER,
WM. KENNEDY.